United States Patent [19]
Pashea et al.

[11] Patent Number: 5,865,398
[45] Date of Patent: Feb. 2, 1999

[54] MULTI-FUNCTION ENGINE AIR INLET CONTROL

[75] Inventors: Terry F. Pashea, Florissant; Donald L. Williams, St. Louis, both of Mo.

[73] Assignee: McDonnell Douglas Corporation, St. Louis, Mo.

[21] Appl. No.: 783,014

[22] Filed: Jan. 14, 1997

[51] Int. Cl.⁶ .............................. B64D 33/02; F02C 7/057
[52] U.S. Cl. ........................................ 244/53 B; 60/39.092
[58] Field of Search ....................... 60/39.092; 244/53 B, 244/73 R, 53 R; 55/306

[56] References Cited

U.S. PATENT DOCUMENTS

| | | | |
|---|---|---|---|
| 3,568,694 | 3/1971 | Johnson | 244/53 B |
| 3,618,878 | 11/1971 | Skidmore et al. | 244/53 B |
| 4,203,566 | 5/1980 | Lord | 244/53 B |
| 4,474,345 | 10/1984 | Musgrove | 244/53 B |
| 4,587,803 | 5/1986 | Nightingale | 244/53 B |
| 4,899,958 | 2/1990 | Horikawa | 244/53 B |

FOREIGN PATENT DOCUMENTS

195896   1/1980   U.S.S.R. ............................... 244/53 B

*Primary Examiner*—William Grant
*Attorney, Agent, or Firm*—Westerlund & Powell, P.C.; Raymond H.J. Powell, Jr.; Robert A. Westerlund

[57] ABSTRACT

A multi-function air inlet control apparatus for an aircraft engine includes an air inlet frame housing a plurality of adjacent, spaced apart louvers attached by hinges at opposing ends to the air inlet frame. The hinges allow the louvers to pivot through a substantially 180 degree angle defined by a vertical plane of the air inlet frame. A linking device interconnects with each of louvers, whereby the louvers are moved in unison through the substantially 180 degree angle. An actuator communicates with the linking device for controlling the movement of the louvers in response to operating parameters of the aircraft engine. The multi-function air inlet control is a single device that fulfills the need for additional air during takeoff and other critical modes, and that will dump air overboard when the engine is throttling or is shut down.

19 Claims, 5 Drawing Sheets

MULTI-FUNCTION ENGINE AIR INLET CONTROL

BACKGROUND OF THE INVENTION

The present invention relates generally to inlet structures for aircraft engines, and more particularly, to an engine air inlet having a control mechanism to regulate airflow into the engine in accordance with low or high speed flight characteristics.

The primary purpose of an aircraft engine air inlet is to supply the correct quantity and quality of air to the compressor of the engine. The performance of the inlet is related to the following four characteristics: (1) total pressure recovery; (2) quality of air flow, i.e, distortion and turbulence; (3) drag; and (4) weight and cost. The performance of the inlet must be determined by simultaneously evaluating all four characteristics since the gain in one is often achieved at the expense of another.

Total pressure recovery of the inlet is an important measure of the inlet performance and is defined as the ratio of the total pressure at the compressor face to that of the free stream air flow. It is desired to recover as much of the total pressure at the compressor face as possible because the total pressure of the free stream represents the available mechanical energy of the flow which can be converted into a static pressure increase as the flow is decelerated through the engine. A large static pressure is desirable at the compressor face because the compressor section of the turbine engine does not have to be as large in order to compress the flow to the required pressure for combustion.

Another characteristic of inlet performance is the quality of the airflow delivered to the engine compressor. It is important that the distortion and turbulence of the flow at the compressor face be minimal, otherwise compressor stall or even flame out can result.

Although high performance is desired from the inlet, it must be balanced by tolerable weight and costs. While variable geometry inlets may improve performance over a range of operating conditions, it should be determined whether the improved performance is worth the added complexity, weight, and cost of the variable inlet geometry.

The inlet should be sized to provide the proper amount of air to the engine at all flight conditions. All inlet designs require compromises in order to achieve an acceptable performance throughout the variations in flight Mach number, angles of attack, and sideslip, as well as variations in the properties of the atmosphere. Normally, the most critical flight conditions or parameters are selected and the inlet is sized for these design conditions. Additional structures or methods are provided to optimize performance on so called "off-design" flight conditions.

At low speeds, for example, most inlets do not have enough cowl capture area to provide the required engine airflow. Cowl capture area is the cross sectional area of the inlet. Auxiliary doors or suck-in doors can provide additional air during take-off.

At higher speeds, however, excess air may exist in the inlet that must be dumped overboard. The excess air can either spill around the cowl lips or the excess air can be dumped through bypass doors. The inlet designer must also consider that both spillage and bypass air produce drag.

In light of the foregoing, there exists a need for a simplified, variable geometry, engine air inlet having a control mechanism that can regulate the airflow into the engine in accordance with low or high speed flight characteristics, especially "off design" flight conditions.

SUMMARY OF THE INVENTION

The present invention is therefore directed to a multi-function engine inlet control which substantially overcomes one or more of the problems due to the limitations and disadvantages of the related art.

In general, the multi-function air inlet control of the present invention is a single device that fulfills the need for additional air during takeoff and other critical modes, and that will dump air overboard when the engine is throttling or is shut down. The device is a multi-position louvered mechanism driven by an electric actuator positioned by an air inlet controller (AIC). The AIC uses aircraft and inlet parameters (e.g., throttle position, aircraft pitot/static pressures, duct pitot/static pressures, angle of attack, temperature, etc.) for determining the correct actuator and louver position.

The design of the present invention minimizes the size of the air inlet devices, while providing a lighter and more efficient structure. Fewer numbers of actuators may be required as compared to conventional air inlets, resulting in a simpler AIC control and increased reliability. In addition, the ability to completely close off the air inlet with the louvers while the aircraft is on the ground prevents foreign object damage or environmental contamination. Although fewer in number, the actuators themselves may be more complex, and additional AIC programming may be required, depending on the location and size of the air inlet device, as well as the operating environment and mission of the aircraft.

To achieve these and other advantages, and in accordance with the purpose of the invention as embodied and broadly described, the invention provides for a multi-function air inlet control apparatus for an aircraft engine, comprising: an air inlet frame having a pair of laterally spaced apart side walls; a plurality of adjacent, spaced apart louvers attached by hinges at opposing ends to one of the pair of side walls of the air inlet frame, the hinges allowing the louvers to pivot through a substantially 0–180 degree angle defined by a vertical plane of the air inlet frame; a linking means interconnected with each of the plurality of louvers, whereby the louvers are moved in unison through the substantially 0–180 degree angle; an actuator communicating with the linking means for controlling the movement of the louvers in response to operating parameters of the aircraft engine.

The multi-function air inlet control is a single device that fulfills the need for additional air during takeoff and other critical modes, and that will dump air overboard when the engine is throttling or is shut down.

BRIEF DESCRIPTION OF THE ATTACHED DRAWINGS

The foregoing and other objects, aspects and advantages will be better understood from the following detailed description of a preferred embodiment of the invention with reference to the drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility.

The present invention is directed to multi-function air inlet control for an aircraft engine. It is understood that the air inlet control described herein may be used with various types of aircraft engines, broadly including propeller and jet propulsion, and specifically including reciprocating, turbojet, turboprop, turbofan, and ramjet engine configurations.

Figure 1:
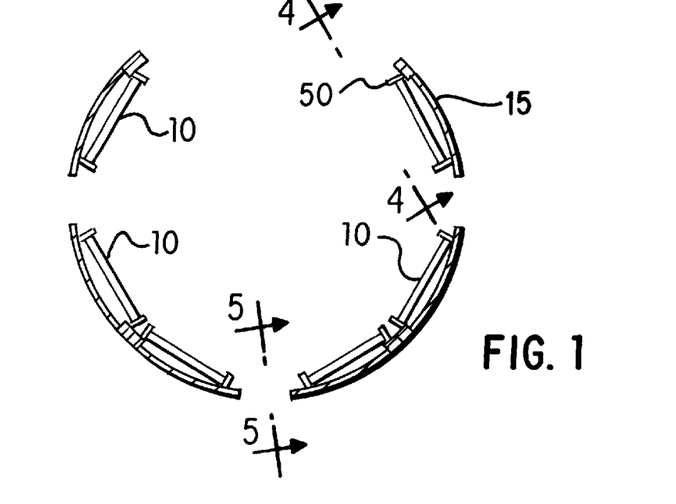
FIG. 1 is a cross sectional view of a plurality of multi-function air inlet controls according to the present invention, disposed on an engine cowl looking aft.
Figure 2:
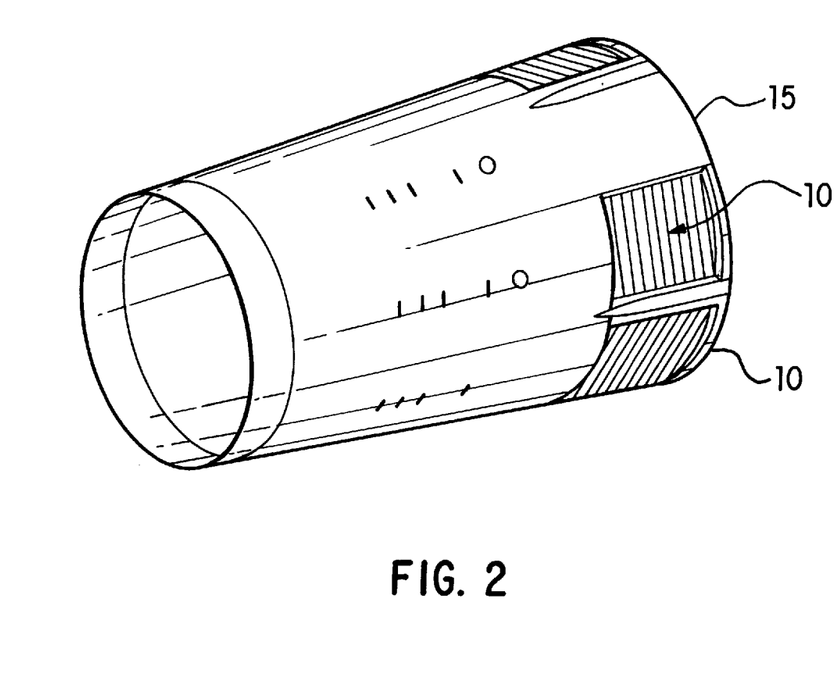
FIG. 2 is a side perspective view of the multi-function air inlet control of the present invention as it would appear installed on an aircraft engine.

FIGS. 1 and 2 illustrate exemplary locations for the air inlet control 10 on an aircraft engine. FIG. 1 is a cross sectional view, looking aft, of an aircraft engine cowl 15 with a plurality of air inlet controls 10 spaced around the cowl 15. FIG. 2 is a side perspective side view of the aircraft engine cowl 15 with a plurality of air inlet controls 10 spaced around the cowl 15.

Reference will be now be made in detail to FIGS. 3A, 3B, 4 and 5, which illustrate perspective, front and side views of the air inlet control of the present invention. The main components of the air inlet control 10 are the air inlet frame 20, a plurality of louvers 30, a louver linking means 40 and an actuator 50 for moving the linking means 40, and therefore the louvers 30 through a substantially 180 degree range of motion.

The air inlet frame 20 illustrated in FIGS. 1 through 5 is basically of rectangular shape, having a pair of laterally spaced apart and parallel side walls 21a and 21b. The air inlet frame may take on various shapes, however, depending on the location of the air inlet requirements for a particular engine installation. For example, the frame may have a square shape, or the side walls 21a and 21b may not be completely parallel and may taper in or out accordingly.

Figure 5:
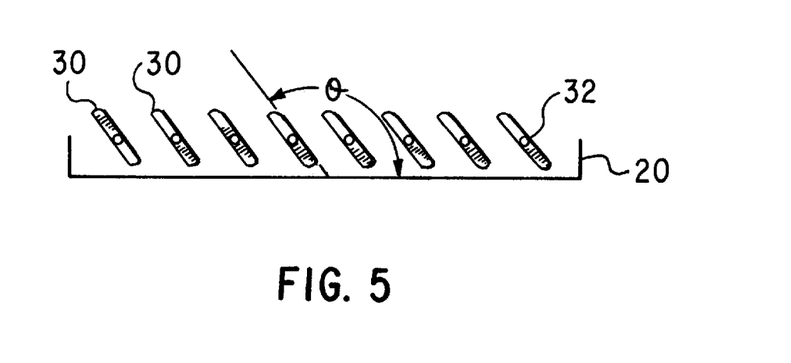
FIG. 5 is an side view of the multi-function air inlet control of the present invention taken along the perspective of line 5—5 in FIG. 1.

The air inlet frame 20 supports a plurality of adjacent, spaced apart louvers 30. The louvers 30 are attached by hinges or pins 32 (see FIGS. 3B and 5) at opposing ends of the louvers to one of the pair of side walls 21a or 21b of the air inlet frame. The hinges or pins 32 allow the louvers 30 to pivot through a substantially 180 degree angle θ defined by a vertical plane of the air inlet frame as shown in FIG. 5.

For such substantially 180 degree movement, the hinge or pin 32 is preferably located in the center of each of the louvers 30 to minimize torque forces on the blades caused by the air stream flowing into the air inlet control 10, during take-off for example, or flowing out of the air inlet control 10, for example, when air is being dumped during throttling.

Figure 6:
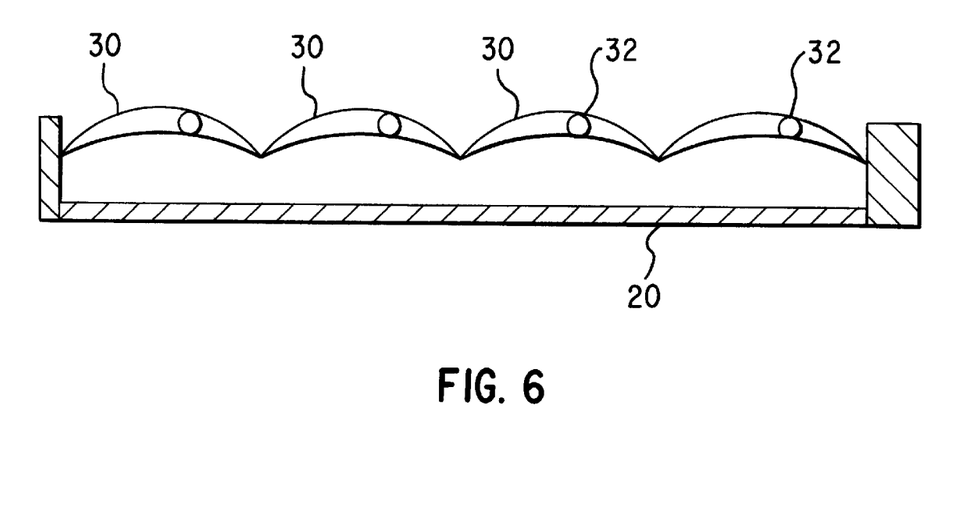
FIG. 6 is a schematic representation of an embodiment of the present invention employing cambered louvers having sides contacting one another in the substantially 0 or 180 degree position. The particular cambered shape may vary from that which is schematically depicted.

Alternatively, the hinge or pin 32 may be positioned closer to one edge or the other of the louver 30 as shown schematically in FIG. 6.

The number, spacing, and width of the louvers 30 will vary depending on the operating parameters of the aircraft engine. The louvers 30 are generally flat rectangular blades as shown in FIG. 5, although they may be designed with a certain symmetrical or asymmetrical camber for improved aerodynamic performance. It is understood that typical considerations of air flow distortion and turbulence should be considered when implementing a specific louver design (shape, length, width and thickness) within the operating requirements of the aircraft engine.

The width of the louver is chosen so that in a closed position wherein the louvers 30 are pivoted to their substantially 0 or 180 degree positions as shown schematically in FIG. 6, each of the louvers 30 contacts the next adjacent louver 30, or in a further embodiment after the louvers 30 are pivoted substantially to their substantially 0 or 180 degree positions, each louver 30 extends slightly beyond the next adjacent louver 30. This closed position would prevent foreign object damage (FOD) or environmental contamination of the aircraft engine while it is on the ground.

Figure 3A:
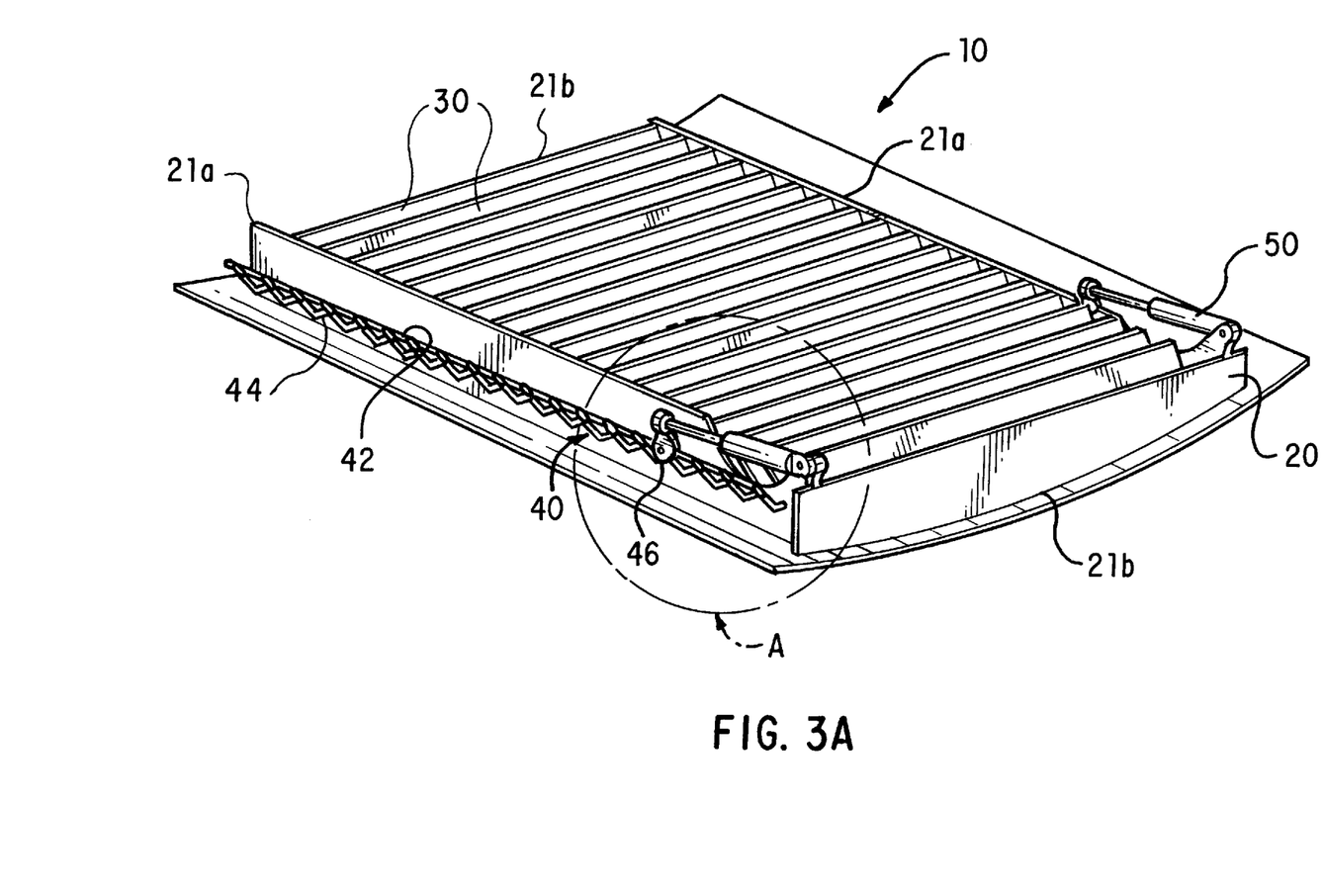
FIG. 3A is an interior perspective view of the multi-function air inlet control of the present invention.
Figure 3B:
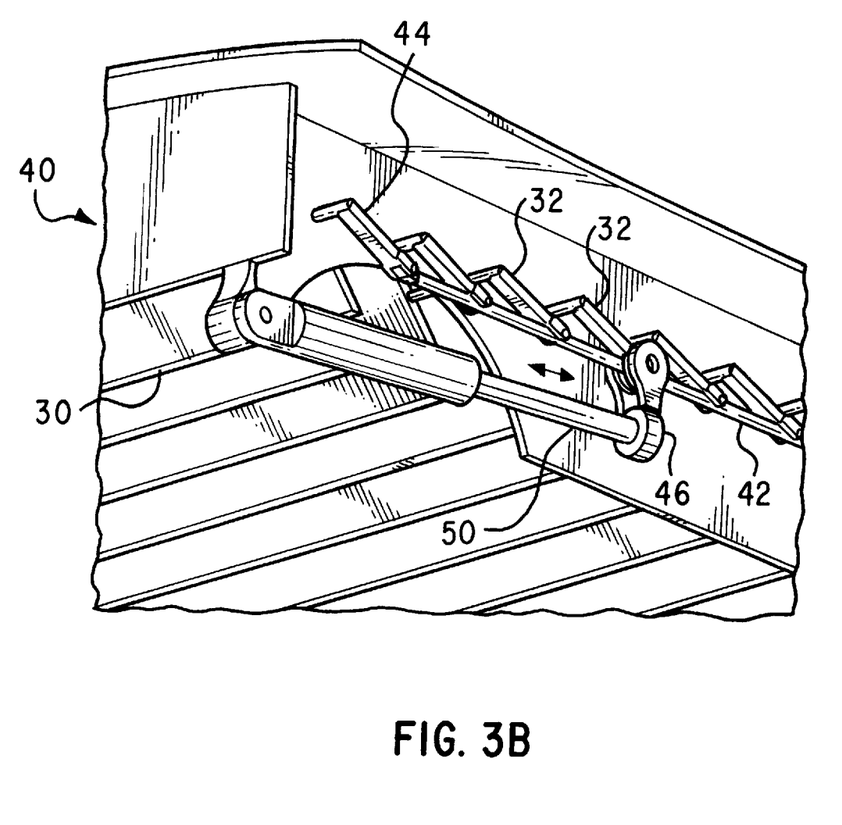
FIG. 3B is a more detailed view of the portion 'A' of FIG. 3B showing the actuator and linking means of the present invention.

A linking means 40 interconnects each of the plurality of louvers 30, such that the louvers 30 are moved in unison through the substantially 180 degree rotation angle. Referring to FIGS. 3A and 3B, the linking means 40 is comprised of a thin metal drive rod 42 having a plurality of drive arms 44 pivotedly connected thereto. Each of the plurality of drive arms 44 is in turn connected to one of the louvers 30 by the hinge or pin 32.

Figure 4:
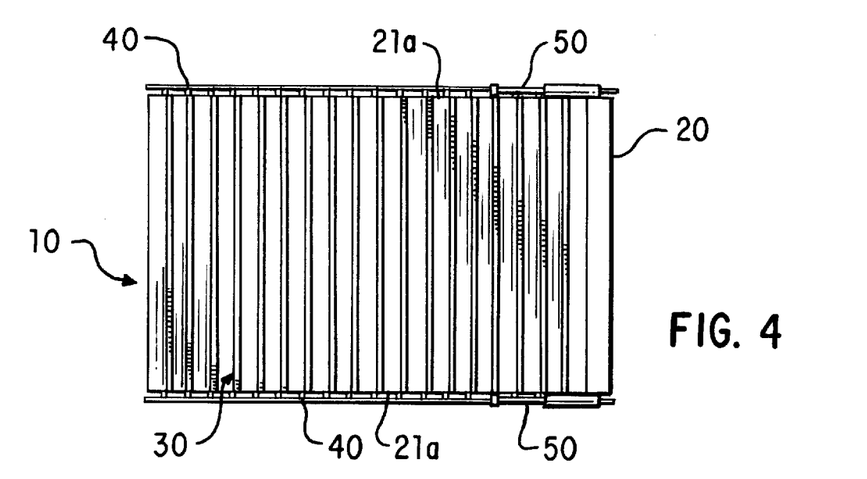
FIG. 4 is a front view of the multi-function air inlet control of the present invention taken along the perspective of line 4—4 in FIG. 1.

As shown in FIGS. 3A and 4, two linking means 40 and two actuators 50 are provided at each opposing end of the louvers 30. It is understood, however, that only one linking means 40 and one actuator 50, located at one end or the other of the louver 30 may be used as well within the scope of the present invention. Alternatively, the single linking means 40 and actuator 50 may be centrally located within the spaced defined by the air inlet control 10, although air flow distortion and turbulence will be increased. In a further embodiment, two linking means 40 may be controlled by a single actuator 50 located at either end of the louver 30 or centrally located. In such as embodiment, an additional drive rod 42 would be connected to the single actuator 50 to position both sets of drive arms 44 connected at opposite ends of the louvers 30.

The air inlet frame 20, louvers 30, and linking means 40 are preferably made of a strong, but lightweight metal, for example titanium.

The movement of the linking means 40, and therefore the position of the louvers 30 is controlled by an electrical actuator 50 communicating with the linking means 40. Specifically, the actuator 50 is connected to the drive rod 42 via a connecting link 46 as shown in FIG. 3B. As is apparent from FIG. 3B, movement of the actuator 50 in either direction in accordance with the arrow results in movement of the drive rod 42, the drive arms 44, and thus the louvers 30.

The actuator is positioned by an air inlet controller (AIC). As shown in FIGS. 3A and 4, one actuator 50 is disposed at each side wall 21a for communicating with each linking means 40. As described above, only one actuator 50 may be provided for an embodiment utilizing a single linking means 40. Alternatively, a single actuator 50 may be modified to control more than one linking means 40. Furthermore, two actuators 50 may be provided with two linking means 40, with one actuator moving the louvers 30 in one direction, that is, through the substantially 0–180 degree angle as shown in FIG. 5, and the other actuator moving the louvers 30 in the other direction, that is, through the substantially 180–0 degree angle as shown in FIG. 5.

The electrical actuator 50 controls the movement of the louvers 30 in response to positioning information from the AIC. The AIC uses the various operating parameters of the aircraft engine, including throttle position, aircraft pitot/static pressures, duct pitot/static pressures, angle of attack, temperature, etc., to position the electrical actuator 50.

The present invention thus allows for a single device to control the amount of air flow into and out of the engine in a multi-function environment. In operation, for example, referring to FIG. 5, the louvers 30 are set at 135 degrees for take-off, 90 degrees for unstart, 20 degrees for by-pass, and 0 degrees for the shut-down or off condition. Unstart refers to the situation where the air flow through the engine is lost momentarily, resulting in a sudden loss of thrust.

Accordingly, at low speeds, the 135 degree angle of the louvers 30 approximates the intake function performed by the conventional auxiliary doors or suck-in doors to provide additional air during take-off. At higher speeds, where excess air may exist in the inlet, the 20 degree angle of the louvers 30 approximates the dumping function performed by the conventional bypass doors.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

Having thus described my invention, what we claim as new and desire to secure by letters patent is as follows:

1. A multi-function inlet control apparatus for an aircraft engine, comprising:
   a four sided air inlet frame formed by two pairs of laterally spaced side walls;
   a plurality of parallel extending louvers positioned adjacent to one another,
   a plurality of pairs of hinges, each pair of hinges attached to opposite ends of a louver and further attached to a side wall of the inlet frame, said hinges supporting the louvers for pivotal movement substantially through a 180 degree angle defined by a vertical plane of the air inlet frame until each louver confronts adjacent louvers on either side to close a passageway through the inlet frame;
   linking means interconnected with each of said plurality of parallel extending louvers, whereby the louvers are movable in unison substantially through a 180 degree angle; and
   an actuator communicating with the linking means for moving the louvers responsive to changes in the operating parameters of the aircraft engine.

2. The multi-function air inlet control apparatus of claim 1, wherein said actuator is an electrical actuator that is positioned by inputs from an air inlet controller in response to the operating parameters of the aircraft engine.

3. The multi-function air inlet control apparatus of claim 2, wherein the air inlet frame is rectangular-shaped.

4. The multi-function air inlet control apparatus of claim 2, wherein the air inlet frame is square-shaped.

5. The multi-function air inlet control apparatus of claim 2, wherein said hinges are centrally located with reference to first and second edges of each of the louvers.

6. The multi-function air inlet control apparatus of claim 2, wherein said hinges are located closer to a first edge of each of the louvers than to a second, opposite edge of each of the louvers.

7. The multi-function air inlet control apparatus of claim 2, wherein said louvers are flat rectangular blades.

8. The multi-function air inlet control apparatus of claim 2, wherein said louvers have a cambered shape.

9. The multi-function air inlet control apparatus of claim 2, wherein said louvers have sufficient width so that when each louver is in a closed position corresponding substantially to 0 or 180 degrees, opposite sides of each of the louvers contact confronting sides of adjacent louvers disposed on either side.

10. The multi-function air inlet control apparatus of claim 2, wherein said louvers have sufficient width so that when each louver is in a closed position corresponding substantially to 0 or 180 degrees, a side of each of the louvers extends slightly beyond a confronting side of a next, adjacent louver.

11. The multi-function air inlet control apparatus of claim 2, wherein said linking means is comprised of a thin metal shaft connected to a plurality of drive arms, each of the drive arms being pivotedly connected to the hinge at one end of each of the louvers.

12. The multi-function air inlet control apparatus of claim 11, wherein said electrical actuator communicates with the linking means connected to one end of each of the louvers.

13. The multi-function air inlet control apparatus of claim 2, wherein said linking means comprises two thin metal shafts, each of the metal shafts being connected to a plurality of drive arms, each of the drive arms being pivotedly connected to the hinge at opposite ends of each of the louvers.

14. The multi-function air inlet control apparatus of claim 13, further comprising another electrical actuator, whereby each of the electrical actuators communicates with the respective thin metal shafts connected at opposite ends of each of the louvers.

15. The multi-function air inlet control apparatus of claim 14, wherein said louvers are moved in a first direction by one of the two electrical actuators, and in a second direction by the other of the two electrical actuators.

16. The multi-function air inlet control apparatus of claim 13, wherein said electrical actuator communicates with each of the thin metal shafts connected at opposite ends of each of the louvers.

17. The multi-function air inlet control apparatus of claim 2, where said louvers are positioned at 135 degrees for take-off operation and at 20 degrees for by-pass operations of the aircraft engine.

18. A multi-function inlet control apparatus for an aircraft engine, comprising:
   an air inlet frame including two pairs of laterally spaced apart side walls;
   a plurality of separate, parallel extending louvers adjacently disposed to one another;
   a plurality of pairs of hinges disposed such that each pair of hinges are attached to opposite ends of a louver and are also attached to opposite side walls of the air inlet frame, whereby each pair of hinges supports a separate louver for pivoting through an angle in excess of 90 degree as defined by a vertical plane of the air inlet frame;

lining means interconnected with each of said plurality of louvers, whereby the louvers are movable in unison through an angle in excess of 90 degree; and an actuator communicating with the linking means for moving the louvers in response to operating parameters of the aircraft engine.

19. The multi-function air inlet control apparatus of claim 18, wherein said louvers are positioned at substantially 135 degrees for take-off operation and at substantially 20 degrees for by-pass operations of the aircraft engine.

* * * * *

UNITED STATES PATENT AND TRADEMARK OFFICE
CERTIFICATE OF CORRECTION

PATENT NO.   : 5,865,398
DATED        : February 2, 1999
INVENTOR(S)  : TERRY F. PASHEA et al.

It is certified that error appears in the above-identified patent and that said Letters Patent is hereby corrected as shown below:

In Column 1, line 5,  insert -- This invention was made under Contract No. NAS3-27235. The Government has certain rights in this invention. -- .

Signed and Sealed this

Twenty-ninth Day of June, 1999

Attest:

Q. TODD DICKINSON

Attesting Officer

Acting Commissioner of Patents and Trademarks